(12) United States Patent
Singh et al.

(10) Patent No.: US 12,547,627 B1
(45) Date of Patent: Feb. 10, 2026

(54) QUERY RESOLUTION

(71) Applicant: Honeywell International Inc., Charlotte, NC (US)

(72) Inventors: Ankit Singh, Apex, NC (US); Waad Subber, Schenectady, NY (US); Eric Hartye, Oak Ridge, TN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/797,544

(22) Filed: Aug. 8, 2024

(51) Int. Cl.
*G06F 16/2453* (2019.01)
*G06F 16/22* (2019.01)

(52) U.S. Cl.
CPC .... *G06F 16/24549* (2019.01); *G06F 16/2237* (2019.01)

(58) Field of Classification Search
CPC ................ G06F 16/24549; G06F 16/2237
USPC .................... 707/715, 610; 706/50
See application file for complete search history.

(56) References Cited

U.S. PATENT DOCUMENTS

| | | | | |
|---|---|---|---|---|
| 10,289,632 B1* | 5/2019 | Brealey | .............. | G06F 16/283 |
| 11,675,810 B2* | 6/2023 | Xu | .............. | G06F 16/2272 707/610 |
| 12,259,896 B1* | 3/2025 | Chowdhary | ........ | G06F 16/2237 |
| 2005/0138067 A1* | 6/2005 | Billsus | .............. | G06F 16/9535 707/E17.112 |
| 2008/0235221 A1* | 9/2008 | Burns | .............. | G06F 21/6227 |
| 2012/0215804 A1* | 8/2012 | Christensen | .............. | G06F 40/18 715/764 |
| 2013/0311509 A1* | 11/2013 | Sorkin | .............. | G06F 16/245 707/769 |
| 2016/0055225 A1* | 2/2016 | Xu | .............. | G06F 11/32 707/624 |
| 2019/0384762 A1* | 12/2019 | Hill | .............. | G06F 16/2272 |
| 2025/0173343 A1* | 5/2025 | Perinchery | .............. | G06F 16/783 |

* cited by examiner

*Primary Examiner* — Giovanna B Colan

(57) ABSTRACT

The present disclosure provides approaches for enhanced query resolution. Initially, a user query is processed to determine a contextual data and identifying one or more indexes from a plurality of indexes. The indexes may be searched to respond to the user query. For each identified index, a permissible content length for a summary of data available in the index is calculated based on the number of indexes determined to be searched and the context size of a query resolution model to be used for processing the user query. Summary of the information available in each index is generated using a summarization model. The sum of content lengths of summaries of each of the indexes does not exceed the context size of the query resolution model. User query and the generated summaries are then provided to the query resolution model for generating a response to the user query.

20 Claims, 8 Drawing Sheets

QUERY RESOLUTION

BACKGROUND

With advancements in information technologies, it has become possible to develop intelligent interaction software and devices that generate responses to user queries based on available data and user inputs. For example, data related to an organization's manufacture and sales may help in resolving user queries related to the organization's finances and may also be used to create a detailed analytical report on the organization's finances. In order to resolve the user queries, the organization may directly integrate a Large Language Model (LLM) to parse a user query and the data related to the organization. However, owing to the LLMs generic nature, constricted training capabilities, and limited processing capability, this direct integration may often be too generic, resulting in responses that, while meaningful and logically related to the user query, may be unreliable and lack context-specific relevance.

BRIEF DESCRIPTION OF FIGURES

Systems and/or methods are now described, in accordance with examples of the present subject matter and with reference to the accompanying figures, in which.

DETAILED DESCRIPTION

Figure 1:
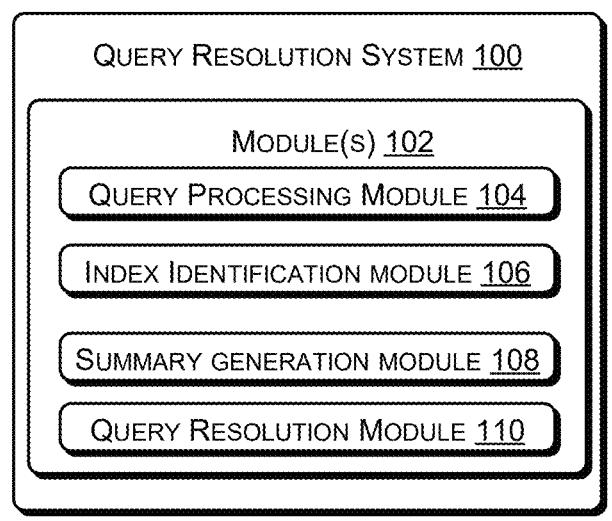
FIG. 1 illustrates a query resolution system, according to an example.

Typically, organizations across various industries collect extensive data through their operational, research, and strategic activities in structured or unstructured formats. The data is not only useful for the organization's research and daily activities but is also a great source of data for generating insightful responses to user queries. For example, data related to an organization in the aviation industry such as fuel consumption, maintenance schedules, routes of flights, operational hours of flights, etc. may help in resolving user queries related to the organization's predictive maintenance, route optimization, cost analysis, etc. and can also be used to create a detailed analytical report on the organization's finances.

As a conventional approach, applications have been developed which accumulate, process, and utilize large amounts of data and generate reports that may be stored and indexed for future references, in case a user query arises. Data leveraged by such applications is typically stored and indexed in a Vector Database containing indexes, with each index holding vector embeddings of documents including but not limited to a specific application, organization, application/organisation combination, customer identification parameters, etc. Such applications thus rely on retrieval of the data stored in the different indexes in the vector database to generate a user specific response for the user query.

Vector databases are typically structured such that each index represents a combination of an Application Identifier (AppID) and a Customer Identifier (CustomerID). For instance, if there are two applications, 'App1' and 'App2', and two customers, 'Customer1' and 'Customer2', the indexes in the Vector Database may be 'App1-Customer1', 'App1-Customer2', 'App2-Customer1', and 'App2-Customer2'. The conventional approach may thus analyse the user query to identify specific Application Identifier and Customer Identifier, and accordingly make a query in a single index, identified based on the Application Identifier and Customer Identifier, thereby limiting the response to data of a single index only.

The conventional approach, although effective for specific use cases, has limitations, such as inefficiency when a query requires searching multiple indexes as the conventional applications are able to search data only within a single index at a time. Additionally, the increase in number of index categories may also make it more complex and difficult to identify the relevant index that may be analysed for responding to the user query. The conventional approach thus faces restrictions and delays in cases where the data required for responding to the user query lies across multiple indexes.

For instance, to resolve a user query requiring analysing multiple indexes of the vector database, the user may need to submit the same or similar queries repeatedly to search each relevant index individually. Therefore, the entire process not only becomes highly labour intensive and time consuming but may also introduce drawbacks like delays, errors, demand for increased computing resources, etc. due to a greater number of steps and iterations involved, at both, human and computer level. Thus, the conventional approach, although effective for specific use cases, has limitations, such as inefficiency when identifying multiple indexes is required, as the conventional applications are able to search data, only within a single index at a time.

The growing complexity of index hierarchies and substantial increase in data stored in the indexes may further exacerbate these challenges. With the increase in the number of index categories, the conventional approach's reliance on singular index identification becomes increasingly inadequate. The conventional approach may thus often suffer from incomplete or incorrect index identification, leading to incomplete data retrieval. As a result, the response to the user query is either deficient or irrelevant. Further, the vast amount of data distributed across multiple indexes may often exceed the processing capabilities of conventional systems, which are typically constrained by the LLM's generic nature and limited ability to analyse large volumes of data simultaneously. This may further cause loss of context and content as the LLM may be able to process only a part of data within the index identified for responding to the user query. The response, generated by the conventional systems, to the user query may thus lack accuracy and relevance.

The present subject matter describes approaches for providing enhanced query resolution to user queries. The present subject matter describes providing response to a user query based on data stored in more than one index that may be relevant to the user. In one example, the user query may be initially processed to identify one or more indexes from a plurality of indexes for being analysed for responding to the user query. Further, to avoid data loss during analysis of the one or more indexes by a query resolution model, data available in each of the one or more indexes are initially summarized. In one example, summaries of the one or more indexes are generated such that a content length of each summary is within a permissible content length. Further, the permissible content length is determined such that a sum of content lengths of summaries of the one or more indexes does not exceed a context size of the query resolution model. The present subject matter thus facilitates in providing relevant response to a user query by analysing multiple indexes at the same time. Further, by summarizing the indexes and limiting the content length of each summary, the subject matter helps in preventing possible data loss due to limited context size of the query resolution model. This further allows usage of existing large language models (LLMs) instead of developing new and customized LLMs with higher processing capabilities and resource requirements.

In one example implementation of the present subject matter, the user query may be initially processed to obtain contextual data associated with the user query. In one example, the contextual data may be analysed to determine one or more keywords satisfying a predetermined condition. Examples of the predetermined condition for a keyword include, but are not limited to, frequency of appearance of the keyword in the user query and a contextual similarity of the keyword with other keywords appearing in the user query. Once the keywords satisfying the given predetermined condition are identified, the one or more indexes correlated to the one or more keywords may be identified, from a plurality of indexes in a vector database.

In another example, the contextual data of the user query may be analysed to identify one or more user suggested categories related to the user query. The one or more user suggested categories may be defined by the user in the user query itself. For instance, while raising the user query, the user may suggest one or more categories, such as 'Products', 'Sites', 'Applications', indicating few categories of indexes that may be searched to resolve the query. Subsequently, from the one or more user suggested categories, at least one category, relevant to the user query, may be ascertained. The one or more indexes, correlated with the at least one category, may then be identified. The capability to define the one or more user suggested category in the query itself provides users with the flexibility to streamline the search for their query, which further helps in refining the simultaneous multi-index identification. This not only provides for better resource allocation within the query resolution model but also reduces cognitive burden on the user as a timely and appropriate response to the user query can be generated, which enhances the user experience.

In another example, the contextual data of the user query may be analysed to ascertain one or more index identifiers defined by the user within the user query. The index identifiers may indicate, for example, specific IDs or keywords corresponding to the one or more indexes to be searched in the vector database, for providing response to the user query. The query resolution model may thus direct its search specifically to the one or more indexes correlated to the specific IDs or keywords.

Once the one or more indexes are identified, the context size of the query resolution model, to be used for analysing the one or more indexes, may be determined. Based on the context size and the number of indexes determined for analysis, the permissible content length, for summarizing the identified indexes, may be calculated. For example, if the query resolution model has a context size of 32000, and it is identified that 4 indexes need to be searched, the permissible content length may be calculated as 8000 words. Thus, it may be ascertained that the summary of each index may not be greater than the permissible content length of 8000 words. Summaries, having content length within the permissible content length, may then be generated for each of the one or more identified indexes. The sum of content lengths of each of the summaries of the one or more identified indexes thus does not exceed the context size of the LLM implemented by the query resolution model. The summaries may then be parsed through the query resolution model along with the user query in a desired format. The query resolution model may then generate the response to the user query.

The present subject matter thus significantly enhances data retrieval and query resolution by enabling simultaneous searches across multiple indexes. The present approach improves accuracy for complex queries spanning various applications, customers, or sites. By summarizing the multiple indexes, the system provides a comprehensive view of the data, allowing for more informed and insightful responses. The present subject matter thus ensures that complete and contextually relevant data is identified in respect of the user query.

Further, by enabling simultaneous identification of multiple indexes to be searched for the user query, the user is not required to make multiple data or application specific queries, thereby saving effort and time. Simultaneous identification of multiple indexes also helps in avoiding multiple iterations of query processing by the query resolution model. This further helps in reducing delay and requirement of computational resources. Further, by enabling searches across multiple indexes, the present subject matter allows for more comprehensive and accurate retrieval of relevant data, especially for complex queries that span across different applications, customers, or sites, thereby providing improved search accuracy.

Further, summarizing the identified indexes, before sharing data stored within the indexes with the query resolution model, facilitates in ensuring that the data to be analysed is within the processing capabilities of the query resolution model. Furthermore, the dynamic calculation of permissible content lengths for the summaries based on the number of determined indexes and the context size of the query resolution model helps in ensuring that the sum of the content length of the summaries is within the processing capability of the LLM being used. The query resolution model may thus process the entire data within the identified indexes, thus avoiding loss of context and content. This further allows use of existing LLMs for the query resolution model, instead of requiring new and customized LLMs with higher processing capabilities and resource requirements.

The present subject matter is further described with reference to the accompanying FIGS. 1 to 8. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a query resolution system 100, according to an example. The query resolution system 100, hereinafter interchangeably referred to as system 100, may implement enhanced query resolution techniques to respond to a user query raised by a user of an organization. The user query, for example, may be a natural language query that may be processed by the system 100 to provide an adequate response to the user. In one example, the system 100 may analyse data saved in one or more indexes in a database associated with the organization to respond to the user query.

Examples of the system 100 may include, but are not limited to, a server, a laptop, a desktop, a tablet computer, and a smart phone. The system 100 may include module(s) 102. The system 100 may also include components, other than the depicted components, such as datasets, display, input/output interfaces, operating systems, applications, and other software or hardware components (not shown in the figures).

The module(s) 102 may be implemented as a combination of hardware and programming, for example, programmable instructions to implement a variety of functionalities of the module(s) 102. In examples described herein, such combinations of hardware and programming may be implemented in several different ways. For example, the programming for the module(s) 102 may be executable instructions. Such instructions may be stored on a non-transitory machine-readable storage medium which may be coupled either directly with the system 100 or indirectly (for example, through networked means). In one example, the module(s) 102 may include a processing resource, for example, either a single processor or a combination of multiple processors, to execute such instructions. In the present examples, the non-transitory machine-readable storage medium may store instructions that, when executed by the processing resource, implement the module(s) 102. In other examples, the module(s) 102 may be implemented as electronic circuitry.

In one example, the module(s) 102 may include a query processing module 104, an index identification module 106, a summary generation module 108, and a query resolution module 110. The module (s) 102 may implement functions, as required by the system 100, for providing enhanced query resolution for a user query and generating a response for the user query.

In one example implementation, the query processing module 104 of the system 100 may receive a user query from a user of an organization with which the system 100 is associated. The user query, in one example, may be received through a user interface of the system 100. The query processing module 104 may process the user query to obtain contextual data associated with the user query. The processing of the user query to obtain the contextual data may involve, for instance, understanding complex sentences and gauging user intent by considering syntax, semantics, and sentiments associated with the user query. In one example, the contextual data may define a context of the user query to enable the index identification module 106 to identify relevant indexes for responding to the user queries. The contextual data, for instance, may include meaning of words used within the user query, the frequency of a word used within the user query, grouping of words within the user query belonging to a particular class or group, tone in which the user query is being asked by the user, specific keywords or IDs provided by the user in the user query, one or more user suggested categories of indexes that may be relevant for responding to the user query.

The index identification module 106 may then analyse the contextual data obtained by processing the user query to identify one or more indexes from a plurality of indexes in the database. The database may contain structured or unstructured data for various categories of information associated with one or more organizations. In one example, the database may be a vector database having a plurality of indexes. Each index of the vector database may hold vector representation, i.e., vector embeddings of data belonging to one or more organisations. In one example, subsequent to processing the user query, the one or more identified keywords from the user query may be converted to vector representations which may then be matched against the vector representations corresponding to each index for identification of one or more correlated indexes.

Upon identifying the one or more indexes, the summary generation module 108 may access each of the indexes to generate a summary of data available in the index. The data in the indexes may be categorized into one or more categories, such as products manufactured by the organization, manufacturing sites of the organization, customer identification, application identification, audit data, data corresponding to annual product quality review, sales data.

In one example, the summary generation module 108 may generate, for each of the identified indexes, a corresponding summary of data available within the index, such that a content length of each summary is within a permissible content length. In one example, each index may contain large volumes of statistical or non-statistical data, corresponding to one or more categories. The large volumes of data within each index may then be condensed by the summary generation module 108 to have the content length within the permissible content length. In one example, the permissible content length may be determined by the summary generation module 108 based on a number of indexes identified to be searched and a context size of a query resolution model to be used for processing the user query. In one example, the context size of the query resolution model may define a maximum data size of data that may be processed by a Large Language Model (LLM) implemented by the query resolution model at a given time. For example, if the query resolution model has a context size of 39000, and it is identified that 3 indexes need to be searched, the permissible content length may be calculated as 13000 words.

The summary generation module 108 may thus generate the summaries such that a sum of the content lengths of the summaries of the identified one or more indexes does not exceed the context size of the query resolution model. In one example, the summary generation module 108 may implement a mathematical tracker for calculating the permissible content length. The mathematical tracker may calculate the permissible content length for the content length of the summary generated for the identified index. The mathematical tracker may consider various factors, such as the context size of the query resolution model, the number of indexes to be searched, the average length of textual data of documents in each index, and other relevant factors to determine the permissible content length.

The generated summaries of the identified indexes, within the permissible content lengths, and the user query may then be parsed through the query resolution module 110. In one example, the query resolution module 110 may implement the query resolution model to resolve the user query. In one example, the query resolution model may be an LLM. The query resolution module 110 may parse the user query and the summaries of the one or more indexes to provide a relevant response to the user query. The query resolution module 110 may thus appropriately interpret the user query and accordingly utilize the available appropriate context of the indexes, i.e., the generated summaries, to generate a response to the user query, without any loss of context or content. In one example, the response to the user query may be in the form of a report, a document, frequently asked questions, dashboards etc.

Figure 2:
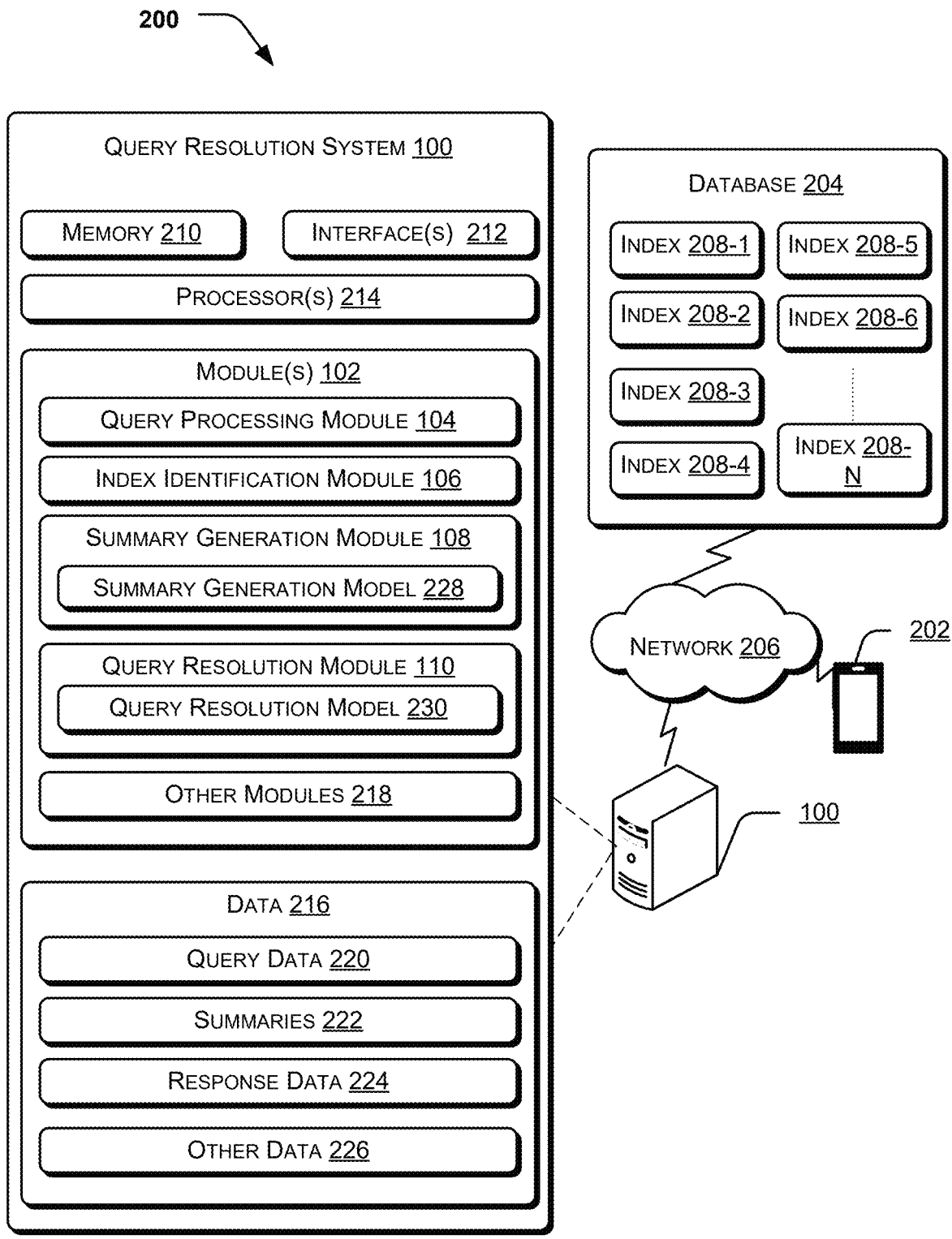
FIG. 2 illustrates a communication environment implementing the query resolution system for resolving user queries, according to an example.

FIG. 2 illustrates a communication environment 200 implementing the system 100, according to another example. In one example implementation, the communication environment 200 may include the system 100, a user device 202, and a database 204 communicating with each other over a network 206. The system 100, the user device 202, and the database 204 may exchange data and signals over the network 206.

The system 100 may be a distributed computing system having one or more physical computing systems geographically distributed at same or different locations. In another example, one or more components of the system 100 may be hosted virtually, for example, on a cloud-based platform, while other components may be geographically distributed at same or different locations. In yet another example, the system 100 may be a stand-alone physical system geographically located at a particular location. As previously described, the system 100 may be implemented to provide responses to the user queries asked by users of one or more organisations.

The user device 202 may include, but is not limited to, a laptop, a desktop, a tablet computer, a personal digital assistant (PDA), and a smart phone. The user device 202 may interact with various components, such as the system 100 of the communication environment 200 via the network 206. The user device 202 may be utilized by the user to raise the user query with the system 100. Further, the system 100 may provide various notifications and the response to the user query over the user device 202. Although only one user device 202 has been illustrated in FIG. 2 for the sake of brevity, it should be understood to a person skilled in the art that any number of user devices 202 may be connected with the system 100 and used by the users for raising the user queries and receiving response to the user queries.

The network 206 may be a wireless network, a wired network, or a combination thereof. The network 206 may also be an individual network or a collection of many such individual networks, interconnected with each other and functioning as a single large network, e.g., the Internet or an intranet. Examples of such individual networks include, but are not limited to, local area network (LAN), wide area network (WAN), the internet, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 206 may include various network entities, such as transceivers, gateways, and routers. In an example, the network 206 may include any communication network that uses any of the commonly used protocols, for example, Hypertext Transfer Protocol (HTTP), and Transmission Control Protocol/Internet Protocol (TCP/IP).

The database 204 may contain data related to the one or more organizations in structured or unstructured formats. In one example, the database 204 may be a vector database having the data categorized into a plurality of indexes 208-1, 208-2, 208-3, 208-4, 208-5, 208-6, . . . , 208-N. The plurality of indexes 208-1, 208-2, 208-3, 208-4, 208-5, 208-6, . . . , 208-N, may be hereinafter collectively referred to as indexes 208 and individually referred to as an index 208. In one example, each index 208 may include vector embeddings of all the documents belonging to a particular category to which the particular index belongs. For instance, each of the indexes 208 may include vector embeddings of data belonging to a different organization. In another example, each of the indexes 208 may include data belonging to a particular category of data, say, sales, manufacturing units, of multiple organizations. In another example, while a set of indexes 208, say, 208-1, 208-2, and 208-3 may include data belonging to a particular organization, each index 208 from the set may include data related to different applications of the same organization. For instance, index 208-1 may include data related a first application or product of a first organization, 208-2 may include data related a second application or product of the first organization, and 208-3 may include data related a third application or product of the first organization.

For the ease of explanation, the description henceforth is described considering that the database 204 includes data of a single organization and each index 208 includes data corresponding to a different category. The various categories of data may include, but are not limited to, product types, different sites, manufacturing data, sales data, profit and loss margins for each manufacturing site, year on year percentage change in sales numbers for various products, upcoming project reports etc.

In one example, the database 204 may be structured such that each index 208 represents a combination of an Application Identifier (Appid) and a Customer Identifier (CustomerId). For instance, if there are two applications, 'App1' and 'App2', and two customers, 'Customer1' and 'Customer2', the indexes in the Vector Database with indexes may be 'App1-Customer1', 'App1-Customer2', 'App2-Customer1', and 'App2-Customer2'.

In one example, the system 100 may communicate with the database 204 over the network 206 for identification of one or more indexes 208 from the plurality of indexes 208 for responding to a user query raised by the user of organization associated with the database 204.

In one example, the system 100 may include memory 210, interface(s) 212, processor(s) 214, data 216, and the module(s) 102. The system 100 may include additional components, such as display, input/output interfaces, operating systems, applications, and other software or hardware components (not shown in the figures).

The memory 210 may be a computer-readable medium, examples of which include volatile memory (e.g., RAM), and/or non-volatile memory (e.g., Erasable Programmable read-only memory, i.e., EPROM, flash memory, etc.). The memory 210 may be an external memory, or internal memory, such as a flash drive, a compact disk drive, an external hard disk drive, or the like. The memory 210 may further include data 216 and or other data which may be received, utilized, or generated during the operation of the system 100.

The interface(s) 212 may communicably couple the system 100 with one or more other entities, such as the database 204 with indexes 208 and the user device 202. The connection or coupling may be through a wired (e.g., Local Area Network, i.e., LAN) connection or through a wireless connection (e.g., Bluetooth®, Wi-Fi). The interface(s) 212 may also enable intercommunication between different logical as well as hardware components of the system 100.

The processor(s) 214 may be implemented as a dedicated processor, a shared processor, or a plurality of individual processors, some of which may be shared. Examples of the processor(s) 214 may include, but are not limited to, microprocessors, microcomputers, microcontrollers, digital signal processors, central processing units, state machines, logic circuitries, and/or any other devices that may manipulate signals and data based on computer-readable instructions.

The module(s) 102, as previously described, may be implemented as a combination of hardware and programming, for example, programmable instructions to implement a variety of functionalities of the module(s) 102. The module(s) 102 may include the query processing module 104, the index identification module 106, the summary generation module 108, the query resolution module 110, and other modules 218. In one example, other modules 218 may further implement functionalities that supplement functions performed by the module(s) 102.

The data 216 includes data that is either received, stored, or generated as a result of functions implemented by any of the module(s) 102 or the system 100. In an example, the information stored and available in the data 216 may be utilized by the module(s) 102 for performing various functions by the system 100. The data 216 may include query data 220, summaries 222, response data 224 and other data 226. The other data 226 may include data received, stored, or generated as a result of functions implemented by the module(s) 102. In one example, the other data 226 may include data that may supplement the system 100 to efficiently perform enhanced query resolution. In one example, data 216 associated with the system 100 may store data for future processing of queries generated by the user.

As previously described in FIG. 1, the system 100 may resolve user queries raised by a user associated with an organization. For instance, a user intending to obtain information regarding an organization with which the user is associated, may send the user query to the system 100 through the user device 202. In one example, the information sought by the user may span across various categories, such as products, sites, customer identification, and year on year profit margins related to the organization.

In one example, upon receiving the user query, the query processing module 104 may request the user to provide certain credentials, such as user ID and password. These credentials may be used by the system 100 to authenticate the user and ascertain if the user is allowed to obtain response to specific user query raised by the user. Upon successful authentication, the user query may be processed by the query processing module 104. In one example, if the user query has been raised in the form of a voice command, the user query may be initially converted to a text by utilising a speech to text converter.

The query processing module 104 may process the user query to obtain contextual data associated with the user query. In one example, the contextual data associated with the user query may be obtained by the query processing module 104 by implementing Natural Language Understanding (NLU) to identify key elements, such as words; entities like name of products and locations; and the overall intent associated with the user query. In one example, the contextual data associated with the user query may be obtained by the query processing module 104 by implementing Named Entity Recognition (NER) for identifying various entities associated with the user query. In one example, the contextual data associated with the user query may be obtained by the query processing module 104 by implementing tokenization of the user query for breaking down the user query into individual tokens. In one example, the contextual data associated with the user query may be obtained by the query processing module 104 by implementing Part-of-Speech Tagging (POS) for assigning grammatical categories like nouns, verbs, etc, to tokens which may further aid in understanding structure of the user query. In one example, the contextual data associated with the user query may be obtained by the query processing module 104 by implementing one or more user defined software or algorithms which may be customizable as per user requirement.

In one example, the query processing module 104 may perform query reformulation for enhancing the understanding of the user query. In one example, the query reformulation may include inserting certain missing words to the user query to make the user more meaningful. In one example, the query reformulation may include rearranging words within the user query to give a proper structure to the user query.

In one example, the contextual data may define the context of the user query to enable the index identification module 106 to identify relevant indexes for responding to the user query. The contextual data, for instance, may include meaning of words used within the user query, frequency of a word used within the user query, grouping of words within the user query belonging to a particular class or group, tone in which the user query is being asked by the user, specific keywords or IDs provided by the user in the user query, one or more user suggested categories of indexes that may be relevant for responding to the user query. In one example, the user query and the contextual data may be stored within the query data 220.

The contextual data may then be analysed by the index identification module 106. To analyse the contextual data, the index identification module 106 may employ one or more approaches. In one example implementation of the present subject matter, the index identification module 106 may analyse the contextual data to ascertain one or more index identifiers defined by the user in the user query. In one example, the index identifiers may indicate specific IDs or keywords corresponding to the one or more indexes to be searched in the vector database, for providing response to the user query. The index identification module 106 may then identify the one or more indexes 208 corresponding to the specific IDs or keywords indicated by the index identifiers that are to be searched to provide response to the user query. Examples of index identifiers defined by the user in the user query may include but are not limited to, stating in the user query, "Retrieve documents with IDs-001, 002, 003", "Provide reports tagged with phrase-Healthcare commodities.", etc. For instance, if the user query requested sales figures of a particular product for a particular year, the index identification module 106 may identify the indexes 208 having the financial data specific to the particular product.

In one example implementation of the present subject matter, in another approach for analysing the contextual data, the index identification module 106 may determine a plurality of keywords from the contextual data. In one example, the index identification module 106 may utilize one or more backend services to determine the plurality of keywords. In another example, the index identification module 106 may utilize a custom model designed for identifying the plurality of keywords.

Upon determining the plurality of keywords appearing in the user query, the index identification module 106 may ascertain the conformance of each of the plurality of keywords to a given predetermined condition. In one example, the predetermined condition may include frequency of appearance analysis to ascertain keywords that may be repeated beyond a certain threshold number. In another example, the predetermined condition may include contextual similarity analysis to identify one or more keywords, from the plurality of keywords, that are contextually similar and are frequently appearing in the user query. In one example, the contextual similar keywords may be defined as keywords having similar meaning, or keywords related to the same industry. The one or more keywords ascertained to conform to the predetermined condition may then be identified from the plurality of keywords.

Upon identification of the one or more keywords, from the plurality of keywords, one or more indexes 208 may be identified from the database 204. The index identification module 106 may identify the indexes 208 based on their correlation to the one or more keywords. In one example, if the index identification module 106 identifies one or more keywords to be "Profit", "Location", "Financial Year", then the index identification module 106 may identify indexes 208 that are correlated to the one or more keywords "Profit", "Location", "Financial Year".

In another approach for analysing the contextual data, the index identification module 106 may analyse the contextual data to identify one or more user suggested categories related to the user query. In one example, the one or more user suggested categories may be defined by the user in the user query. For instance, while providing the user query, the user may include one words, such as "Products", "Sites", "Class of service", "customer ID", to suggest one or more categories of indexes to which the user query may belong. In one example, upon receiving a user request to raise the user query, the interface(s) 212 may provide an interactive user interface providing prompts or checkboxes, such as "Products", "Sites", "Applications", etc. The user may accordingly select one or more prompts or checkboxes to define the user suggested category.

In one example, the query processing module 104 may utilize a LLM to assist the user in providing relevant user suggested categories. For instance, upon receiving the user suggested categories, the query processing module 104 may process the user query to ascertain relevant categories from the user suggested categories which is of relevance to the user query. The query processing module 104 may then communicate the relevant categories to the user on the interface(s) 212 or on an interface of the user device 202. The user may again communicate to confirm the relevant categories or refine the user query to obtain more relevant and targeted user suggested categories. The query processing module 104 may accordingly obtain the contextual data having the one or more user suggested categories identified to be relevant to the user query.

The index identification module 106 may further analyse the one or more user suggested categories and the user query to ascertain at least one category, from the user suggested one or more categories, for being used for identifying the indexes 208. In one example, the index identification module 106 may utilize the same or a different LLM as used by the query processing module 104 to ascertain the at least one category. The index identification module 106 may then identify one or more indexes from the plurality of indexes in the database 204. The identification of the one or more indexes from the plurality of indexes 208 of the database 204 may be done based on the correlation of the index and the at least one user suggested category. In one example, the index identification module 106 may identify one or more indexes which are correlated with the at least one user suggested category, from the plurality of indexes 208 in the database 204.

In one example, to identify relevant indexes 208 from the plurality of indexes 208, the index identification module 106 may map the index identifiers or the one or more keywords or the at least one user suggested category to different tags associated with the indexes 208 of the database 204. For instance, the index identification module 106 may correlate tokens associated with the index identifiers or the one or more keywords or the at least one user suggested category to the tokens associated with the indexes 208 for identification of the one or more indexes 208.

Upon successful identification of the one or more indexes 208, to be analysed for responding to the user query, the summary generation module 108 may generate, for each index of the one or more indexes, a summary of data available in the index. In one example, the summary generation module 108 may implement a summary generation model 228 for generating the summary of data available in the index. In one example, the summary generation model 228 may be a LLM configured to contextually and semantically summarize and analyse data, such as vector data stored in the indexes 208.

In one example, to ensure that the summaries of the indexes are completely analysed by the query resolution module 110, the summary generation module 108 may initially ascertain the permissible content length for the summaries of data available in the one or more indexes 208, identified from the plurality of indexes 208. The permissible content length of the summary may define the maximum size limit of the summary or the maximum number of words which may be present in the summary. In one example, the summary generation module 108 may calculate the permissible content length based on the number of indexes 208 determined to be searched for responding to the user query and the context size of a query resolution model 230. The query resolution model 230 may be implemented by the query resolution module 110 to analyse the user query and the summaries generated by the summary generation module 108 to resolve the user query. In one example, the query resolution model 230 may be a LLM same as or different from the summary generation model 228.

As previously described, the context size of the query resolution model 230 may define a maximum data size of data that may be processed by query resolution model 230 implemented by the query resolution module 110 at a given time. For example, if the query resolution model 230 has a context size of 44000, and it is identified that 4 indexes need to be searched, the permissible content length may be calculated as 11000 words. The sum of the summaries generated for each of the one or more identified indexes 208 may thus not exceed the context size of the query resolution model 230.

Upon determining the permissible content length, the summary generation model 228 of the summary generation module 108 may process the indexes 208 identified by the index identification module 106. The summary generation model 228 may generate, for each of the one or more indexes 208, the summary of data available in the index 208 within the maximum permissible content length. As previously described, the sum of the content lengths of the summaries generated for each of the one or more indexes 208 may not exceed the context size of the query resolution model 230.

In an example, the summary generation module 108 may compare the sum of content lengths of summaries of each of the one or more indexes with the context size of the query resolution model 230. For the sum not exceeding the context size of the query resolution model, the processor(s) 214 may determine the query resolution model to be capable of analysing the summaries of the one or more indexes. In one example, the summaries generated for the one or more indexes 208 may be stored as datasets in the summaries 222 within the data 216. The summaries 222 may then be used to answer the user query by providing relevant context to the query resolution model 230 for the user query which may be utilized for appropriately responding to the user query.

In one example, the summaries generated by the summary generation model 228 which are to be utilized for responding to the user query asked by the user of the organisation may also be analysed to remove redundancy from the generated summaries. The summary generation module 108 may analyse the summaries generated by the summary generation model 228 to check for data which is being constantly repeated but is not important or relevant for answering the user query. The summary generation module 108 may remove such data before the summaries are parsed through the query resolution model 230. In an example, the removal of redundancy from the generated summaries may be done using techniques which include but is not limited to selective pruning, coreference resolution, text summarization, utilizing lexical chains, etc.

The summaries 222 along with the user query, in a desired format, may then be provided to the query resolution module 110. In one example, the desired format may be a vector representation of the user query. The query resolution model 230 of the query resolution module 110 may then parse the user query and the summaries 222 to generate the response to the user query.

In an example, the response to the user query may be generated in the form of a visual or audio indicator through various means, such as displaying textual paragraphs or graphical representations on a screen, or by using a speaker for audio responses, or combining both visual and audio elements like generating a pie chart with an audio explanation. Examples of the visual or audio indicator may include but is not limited to dashboards, charts, generated audio signals, audio frequency signals, and textual summaries. Implementations of the such visual or audio indicator may involve using HTML/CSS or native UI components for text, libraries for graphics, and text-to-speech systems for audio, with integration for synchronized visual and audio outputs. In one example, the visual and audio indicator describing the response to the user query may be rendered on the user device 202. In another example, the visual and audio indicator describing the response to the user query may be rendered on the interface(s) 212 of the system 100. Further, the response to the user query may be saved in the response data 224. In one example, the response data 224 may be stored in the form of a structed dataset which may be utilized for responding to queries raised by users of the organization.

In one example, the response generated for the user query may be used to further train the query resolution model 230 by implementing user feedback techniques. In one example, the query resolution model 230 may provide the user with a feedback form which the user may fill to indicate their satisfaction with the relevancy and the accuracy of the generated response. In one example, the query resolution model 230 may provide the user with checkboxes such "satisfied" or "not satisfied" to choose from based on the accuracy and the relevancy of the generated response. The feedback obtained from the user may then be processed and analysed by the system 100 to further train the query resolution model 230.

In another example, a user may be allowed to interact with the system 100 at every step of the query resolution. In an example, the user raising the user query may be provided, on the interface(s) 212 or the user device 202, the context of the query as defined by the contextual data obtained from the user query. The user may then confirm the correctness of the contextual data obtained by the query processing module 104. The user may further be provided categories of the indexes identified by the index identification module 106 of the system 100. The user may refer to the identified categories of the indexes and, if satisfied, provide an approval for proceeding with the query resolution. In an example, if at any stage the user is not satisfied by the data provided by the system 100, the user may halt the further process of the system 100 and provide inputs or feedback to the system 100 so that contextually correct and relevant data is available for answering the user query.

FIG. 3, FIG. 4, FIG. 5, FIG. 6, and FIG. 7 illustrate example methods 300, 400, 500, 600 and 700 respectively, for generating response to a user query. The order in which the methods are described is not intended to be construed as a limitation, and any number of the described method blocks may be combined in any order to implement the methods, or an alternative method. Further, the methods 300, 400, 500, 600, and 700 may be implemented by processing resource or computing device(s) through any suitable hardware, non-transitory machine-readable instructions, or combination thereof.

It may also be understood that methods 300, 400, 500, 600 and 700 may be performed by programmed computing devices, such as the system 100, as depicted in FIG. 1 to FIG. 2. Furthermore, the methods 300, 400, 500, 600, and 700 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. While the methods 300, 400, 500, 600, and 700 are described below with reference to the system 100 as described above with reference to FIG. 1 to FIG. 2, other suitable systems for the execution of these methods may also be utilized. Additionally, implementation of the methods 300, 400, 500, 600, and 700 is not limited to such examples.

Figure 3:
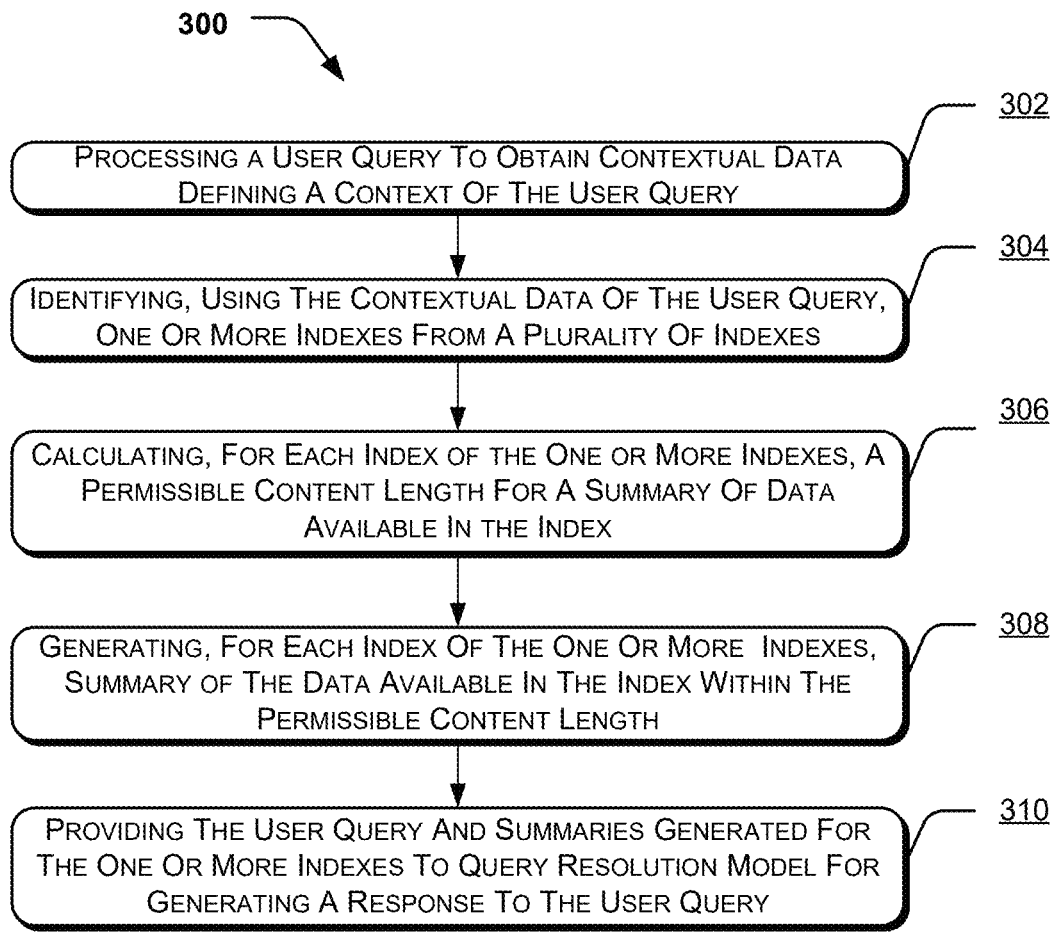
FIG. 3 illustrates a method for resolving a user query, according to an example.

FIG. 3 illustrates a method for resolving a user query, according to an example.

At block 302, a user query may be processed to obtain contextual data defining context of the user query. In one example, the user query may be received from a user of an organization. Upon receiving the user query, a query processing module, such as the query processing module 104 of the system 100 may process the user query to obtain the contextual data defining the context. In one example, processing the user query may involve interpreting user's background, possible purpose of the user query, specifics, content, identifiers, and relevant categories. For instance, if a user enquires about sale of products manufactured by an organisation, the user query may be processed to determine the context, such as the organisation which the user has mentioned, the products that the organisation manufactures, and the financial data of the organization.

In one example, the contextual data, for instance, may include meaning of words used within the user query, the frequency of a word used within the user query, grouping of words within the user query belonging to a particular class or group, tone in which the user query is being asked by the user, specific keywords or IDs provided by the user in the user query, one or more user suggested categories of indexes that may be relevant for responding to the user query.

At block 304, one or more indexes may be identified from a plurality of indexes in a database. In one example, an index identification module, such as the index identification module 106 of the system 100 may analyse the determined context of the user query to identify the one or more indexes. In one example, the plurality of indexes may be stored in a vector database, such as the database 204. To analyse the contextual data, the index identification module may employ one or more approaches. In one example implementation of the present subject matter, the contextual data may be analysed to ascertain one or more index identifiers defined by the user in the user query. In one example, the index identifiers may indicate specific IDs or keywords corresponding to the one or more indexes to be searched in the vector database, for providing response to the user query.

In another approach, the contextual data may be analysed to determine one or more keywords from the contextual data. In yet another approach, the contextual data may be analysed to determine context to identify one or more user suggested categories related to the user query. In one example, the one or more user suggested categories may be defined by the user in the user query.

The one or more indexes may be then identified for being searched and analysed for responding to the user query. In one example, to identify relevant indexes from the plurality of indexes, the index identifiers or the one or more keywords or the at least one user suggested category may be mapped to different tags associated with the plurality of indexes. For instance, tokens associated with the indexes may be correlated with tokens associated with the index identifiers or one or more keywords or the at least one user suggested category.

At block 306, a permissible content length for a summary of data available in each of the one or more indexes is calculated. In one example, a summary generation module, such as the summary generation module 108 may calculate, for each index of the one or more indexes, the permissible content length for the summary of data available in the index. The summary of the data available in the index of each of the one or more indexes may be generated for being provided to a query resolution model such as the query resolution model 230. In one example, the permissible content length may be calculated based on the number of indexes determined to be searched and a context size of the query resolution model to be used for processing the user query.

At block 308, the summary of data available in each index of the one or more indexes may be generated. In one example, a summary generation model, such as the summary generation model 228 may generate the summary for each of the one or more indexes such that a sum of content lengths of summaries of each of the one or more indexes does not exceed the context size of the query resolution model. In one example, the summary generation model may be a large language model similar to the query resolution model.

At block 310, the user query and the summaries generated for each of the one or more indexes are provided to the query resolution model. In one example, the user query may be provided in a desired format to allow the query resolution model to process the user query. The query resolution model may analyse the user query and the summaries to generate a response to the user query.

Figure 4:
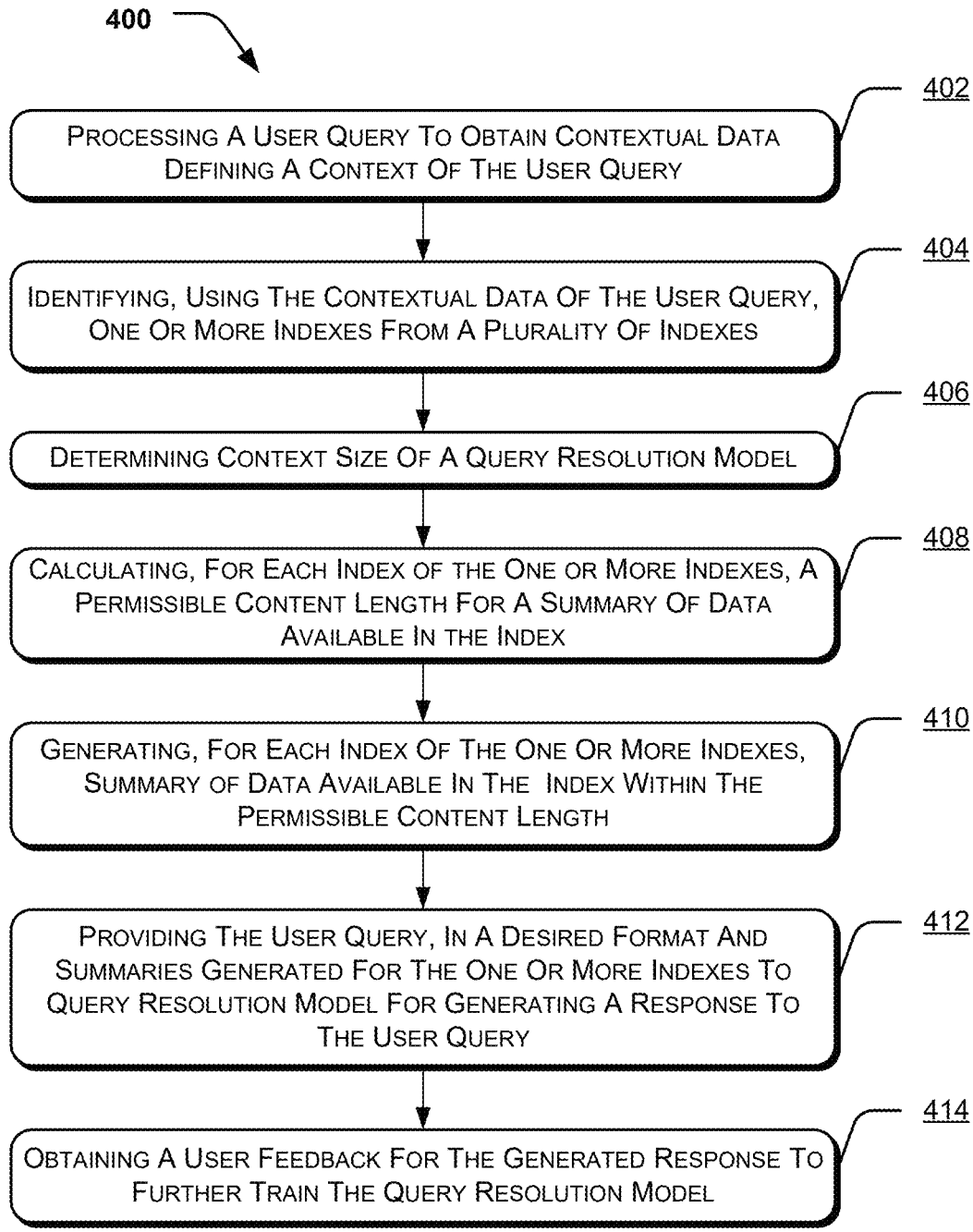
FIG. 4 illustrates a method for resolving a user query, according to another example.

FIG. 4 illustrates a method for resolving a user query, according to another example.

At block 402, a user query may be processed to obtain contextual data defining context of the user query. In an example the user query may be received from a user of an organization linked to a system such as the system 100. The user query may be obtained through one or more interface(s) or user devices connected to the system. In one example, processing the user query to obtain contextual data associated with the user query may involve intricate tasks such deciphering complex sentences and interpreting user intent by analysing multiple parameters, such as syntax, semantics, and sentiments associated with the query. The contextual data may encompass various aspects, such as the meaning of the words used in the query, the frequency of certain terms or phrases, classification of words into groups having contextual similarity, sentiment conveyed by the user, specific IDs provided.

Further, the contextual data obtained through processing the user query may elucidate the context of the user query and thereby enable identification of relevant indexes from a database.

At block 404, one or more indexes may be identified from a plurality of indexes stored in a database. In one example, the one or more indexes may be identified based on analysis of the contextual data determined from the user query. For instance, an index identification module, such as the index identification module 106 may analyse the contextual data to identify the one or more indexes from the plurality of indexes stored in a database, such as the database 204. To analyse the user query, the user query may be converted to its vector representation and the vector representation of the user query may then be compared with document vectors of documents of an organization within an index of the database. In one example, one or more approaches may be utilized to analyse the contextual data to ascertain the one or more indexes.

For instance, the index identification module may employ sentiment analysis to gauge emotional tone expressed in the contextual data. In another example, the index identification module may employ word meaning analysis to decipher semantic relevance of the terms used in the query. In another example, identifiers may be analysed by the index identification module to identify specific codes or tags within the contextual data which may be directed to certain indexes. In another example, frequency analysis may be employed to determine the prevalence of certain terms, phrases or patterns.

The one or more indexes may be then identified for being searched and analysed for responding to the user query. In one example, to identify relevant indexes from the plurality of indexes, index identifiers or one or more keywords or user suggested categories identified from the contextual data may be mapped to different tags associated with the plurality of indexes.

At block 406, processing capability details corresponding to a query resolution model such as the query resolution model 230 may be analysed. The processing capability details corresponding to the query resolution model may be analysed to determine a context size of the query resolution model. In an example, the context size of the query resolution model, which may implement an LLM, may be defined by a maximum number of tokens that the query resolution model can simultaneously process. The context size of the query resolution model may thus define a maximum number of tokens or words or units of meanings which the query resolution model can process at one given time.

At block 408, a permissible content length for a summary of data available in the index for each of the one or more indexes may be calculated. The summary of the data available in the index of each of the one or more indexes may be generated for being provided to the query resolution model for answering the user query. The permissible content length of the summary of data available for each index of the one or more indexes may be calculated based on the number of indexes determined to be searched and the context size of the query resolution model to be used for processing the user query.

For instance, if the query resolution model has a context size of 32000, and it is identified that 4 indexes need to be searched, the permissible content length may be calculated as 8000 words.

At block 410, the summary of data available in each index of the one or more indexes may be generated, to be within the permissible content length. In one example, based on the data of the one or more indexes and the permissible content length, a summary generation model, such as the summary generation model 228 may generate a summary corresponding to each of the one or more indexes. In one example, the summaries may be generated such that the sum of content lengths of summaries generated for each index of the one or more indexes may not exceed the context size of the query resolution model.

In an example, subsequent to generation of summaries for each index of the one or more indexes, the sum of the content lengths of the summaries may be compared with the context size of the query resolution model. If the sum of the content lengths of the summaries does not exceed the context size of the query resolution model, the summary generation module may determine the query resolution model to be capable of analysing the summaries of the one or more indexes.

At block 412, the summaries generated for the one or more indexes and the user query, in a desired format, may be parsed through the query resolution model. The query resolution model may then generate a response to the user query based on the user query and the generated summaries of the one or more indexes.

At block 414, user feedback for the generated response may be obtained. In one example, the feedback may be obtained from the user who had raised the user query. The feedback provided by the user for the generated response may then be analysed to further train the query resolution model. In an example, analysing the feedback from the user may include determining if the user was satisfied with the relevancy of the generated response to the user query.

Figure 5:
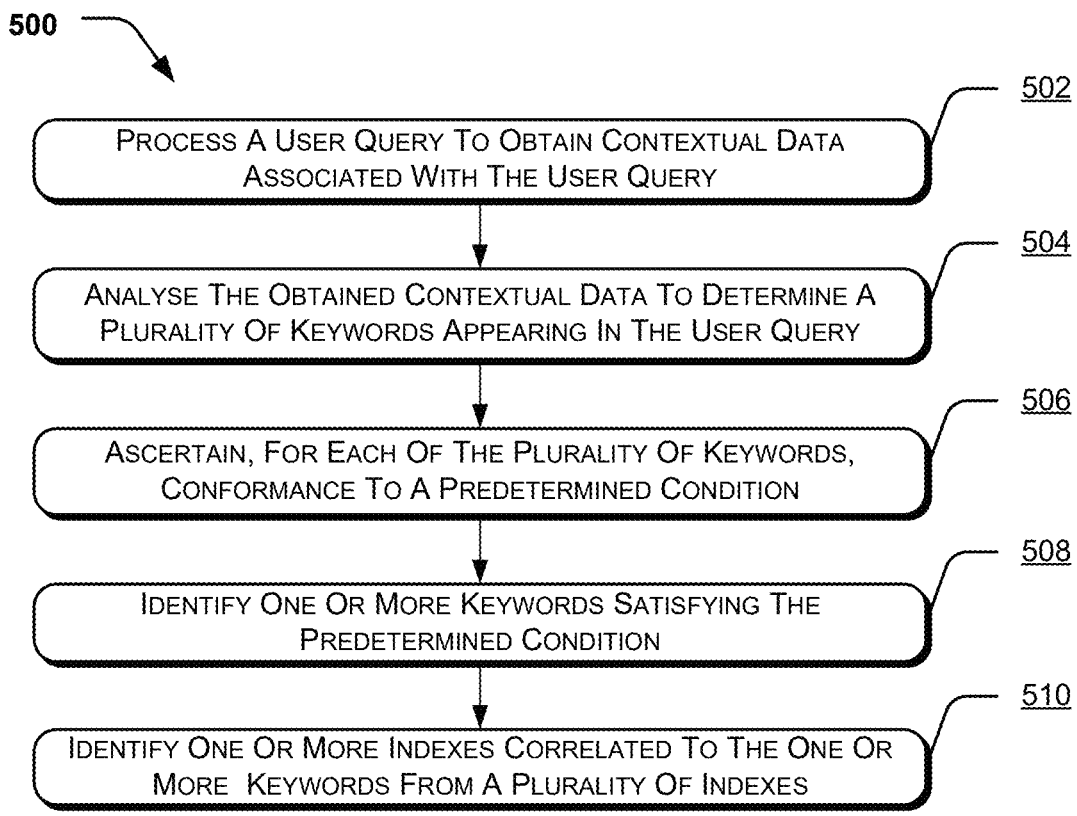
FIG. 5 illustrates a method for identification of indexes to be searched for responding to a user query, according to an example.

FIG. 5 illustrates a method for identification of indexes to be searched for responding to a user query, according to an example.

At block 502, a user query may be processed to obtain a contextual data associated with the user query. In an example, the contextual data associated with the user query may include meaning of words used within the user query, the frequency of a word used within the user query, etc.

In an example, the user query may originate from an individual within an organisation connected to a system such as the system 100. The user query may be processed to obtain contextual data which may involve not only understanding keywords associated with the user query but also intent behind the user query. The processing of the user query may involve analysing syntax, semantics, and the sentiment associated with the query to provide relevant responses to the user.

In an example, processing the complex sentences provided by the user in the user query and deciphering the intent behind the user query may involve consideration of various parameters, such as sentence structures to derive the appropriate contextual data. The contextual data may be used for subsequent stages of query resolution by the system to generate query specific response.

At block 504, the contextual data obtained from processing the user query may be analysed by an index identification module such as the index identification module 106. Analysing the contextual data obtained from the user query may include determination of a plurality of keywords appearing in the user query. In one example, the determination of the plurality of keywords appearing in the user query may include but is not limited to sentiment analysis, keyword meaning analysis, frequency of appearance analysis and contextual similarity analysis.

In an example, a user may ask a query for best budget laptop for streaming. The index identification module may employ techniques like Natural Language Processing to identify plurality of keywords such as "laptop", "budget", and "streaming".

At block 506, conformance of each of the plurality of keywords to a predetermined condition may be ascertained. In an example, the predetermined condition may include at least one of, frequency of appearance of the keyword in the user query and contextual similarity with other keywords appearing in the user query.

In an example, in the user query, analysing the frequency of each keyword may be done to confirm if the keyword appears excessively beyond a certain threshold. In another example, the predetermined condition could entail assessing contextual similarities to pinpoint keywords that share similar meanings or are relevant within the same industry context.

In an example words like profit, returns, financial gain, gross profit, etc. may be confirmed to have contextual similarity. In another example, the frequency of occurrence of a phrase or word such as "Financial Report" may be set at a threshold number say five, then the conformance of frequency of occurrence of "Financial Report", in the user query, against threshold number five may be ascertained.

In one example, the analysis may be performed by using backend services providing such analysis for the contextual data associated with the user query. In one example, the contextual data may be analysed by the user's own custom model designed for performing such analysis.

At block 508, one or more keywords from the plurality of keywords satisfying the predetermined condition may be identified. In the above example, if the phrase or word "Financial Report" is mentioned by the user at least five times in the user query, then the keyword "Financial Report", may be considered to satisfy the predetermined condition and may then be identified. Similarly in the above example the words like profit, returns, financial gain, gross profit, etc. may be conformed to have contextual similarity and may be considered to satisfy the predetermined condition and may then be identified.

At block 510, one or more indexes correlated to the one or more keywords may be identified from the database 204 which may be the vector database such as database 204 having indexes such as indexes 208. The one or more indexes identified may be analysed to respond to the user query. In the above example, the indexes correlated to the one or more keywords identified may include indexes having data relating to "Financial Report".

Figure 6:
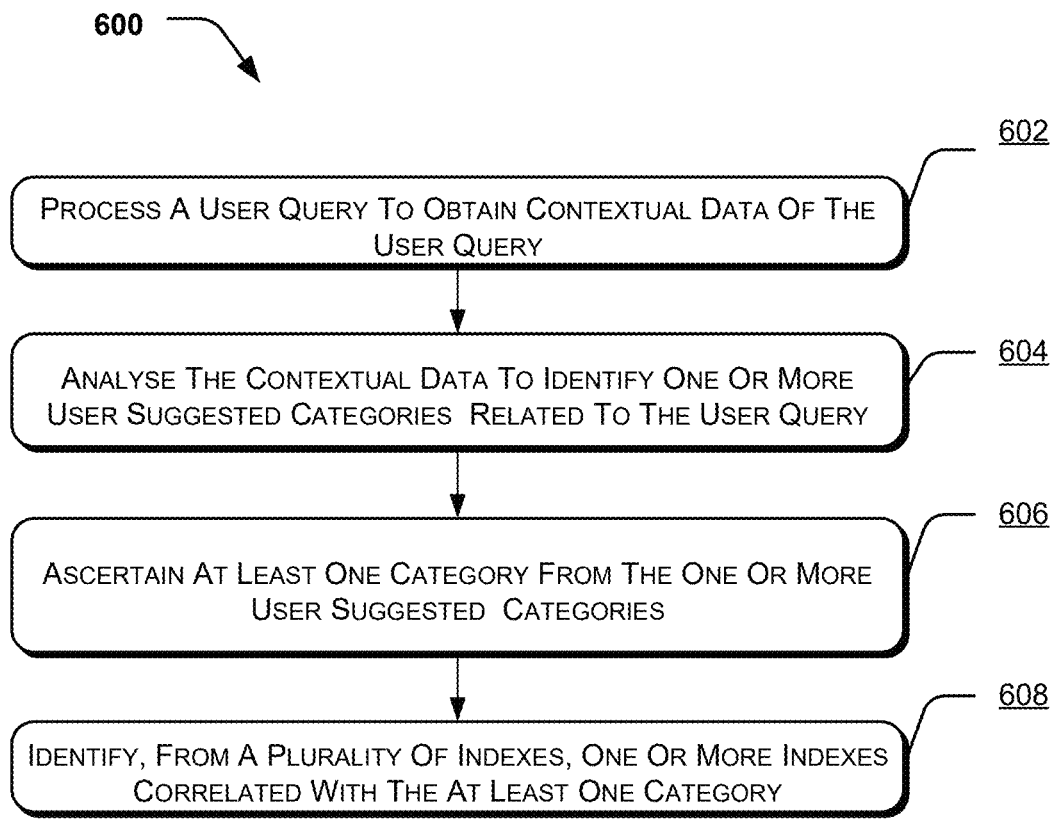
FIG. 6 illustrates a method for identification of indexes to be searched for responding to a user query, according to another example.

FIG. 6 illustrates a method for identification of indexes to be searched for responding to a user query, according to an example.

At block 602, a user query may be processed to obtain contextual data of the user query. In an example the contextual data associated with the user query may include user-specific context such as the user preferences and history, task-specific context such as determining why the query may have been asked, determining document context such as which document the query may cite, certain categories defined by the user, and temporal context.

At block 604, the obtained contextual data of the user query may be analysed. Analysing the obtained contextual data of the user query may include identifying one or more user suggested categories such as "Products", "Sites", "Class of service", "customer ID", defined by the user in the user query, which may be related to the user query.

In one example, the user may define within the user query, one or more user suggested categories such as "Products", "Sites", "Class of service", "customer ID". In one example, the user may define the user suggested category by natural language communication. In another example, the user may define the user suggested category by utilizing a user interface of a user device such as the user device 202 which may provide checkboxes such as "Products", "Sites", "Applications", etc. for the user to select. The user may tick the checkboxes to define the user suggested category.

At block 606, at least one category which is relevant to the user query may be ascertained from the one or more user suggested categories. In an example, the at least one category may be provided to the user so that the user may know the at least one category from the plurality of the user suggested categories which is of relevance to the user query. In an example, the user may then be allowed to subsequently tailor his query based on the at least one category. The at least one category identified as relevant to the user query may be used to identify and search one or more indexes from a plurality of indexes in a database such as database 204 having indexes such as indexes 208.

In an example, an index identification module, such as the index identification module 106 may analyse the one or more user suggested categories and the user query to ascertain at least one category, from the user suggested one or more categories, to be used for identifying indexes.

At block 608, subsequent to the ascertaining of the at least one category which is of relevance to the user query one or more indexes correlated with the at least one category may be identified from the plurality of indexes. The one or more indexes identified from the plurality of indexes may be searched to respond to the user query.

In one example, the index identification module may be utilized to ascertain the at least one category. The index identification module may then identify one or more indexes from the plurality of indexes in the database. The identification of the one or more indexes from the plurality of indexes of the database may be done based on the correlation of the index and the at least one user suggested category. In one example, the index identification module may identify one or more indexes which are correlated with the at least one user suggested category, from the plurality of indexes in the database.

Figure 7:
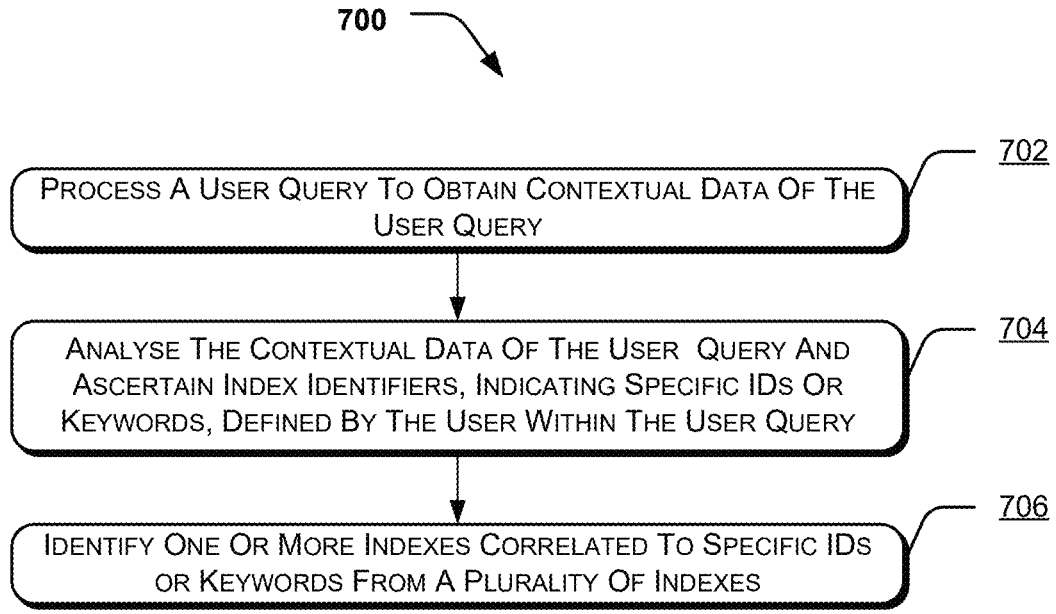
FIG. 7 illustrates a method for identification of indexes to be searched for responding to a user query, according to another example.

FIG. 7 illustrates a method for identification of indexes to be searched for responding to a user query, according to another example.

At block 702, a user query may be processed to obtain contextual data associated with the user query. In an example, the contextual data associated with the user query may include index identifiers provided in the user query, and query specific context. In an example, the contextual data may be the contextual data as described for any of the previous figures.

At block 704, the contextual data obtained from processing the query may be analysed and index identifiers may be ascertained by analysing the obtained contextual data of the user query where the ascertained index identifiers may be defined in the user query. The index identifiers may indicate specific IDs or keywords corresponding to the one or more indexes of a database such as database 204 that are to be searched for providing response to the user query. Examples of index identifiers defined by the user in the user query may include but are not limited to, stating in the user query, "Retrieve documents with IDs-001, 002, 003", "Provide reports tagged with phrase-Healthcare commodities.", etc.

At block 706, one or more indexes corresponding to the specific IDs or keywords indicated by the index identifiers may be identified from the database such as database 204. The one or more indexes identified may be searched to provide response to the user query. For instance, in one example, an index identification module may analyse the contextual data to determine specific identifiers specified by the user in the user query. These identifiers may point to particular IDs or keywords linked to the indexes within the vector database, facilitating a targeted response to the user query.

Figure 8:
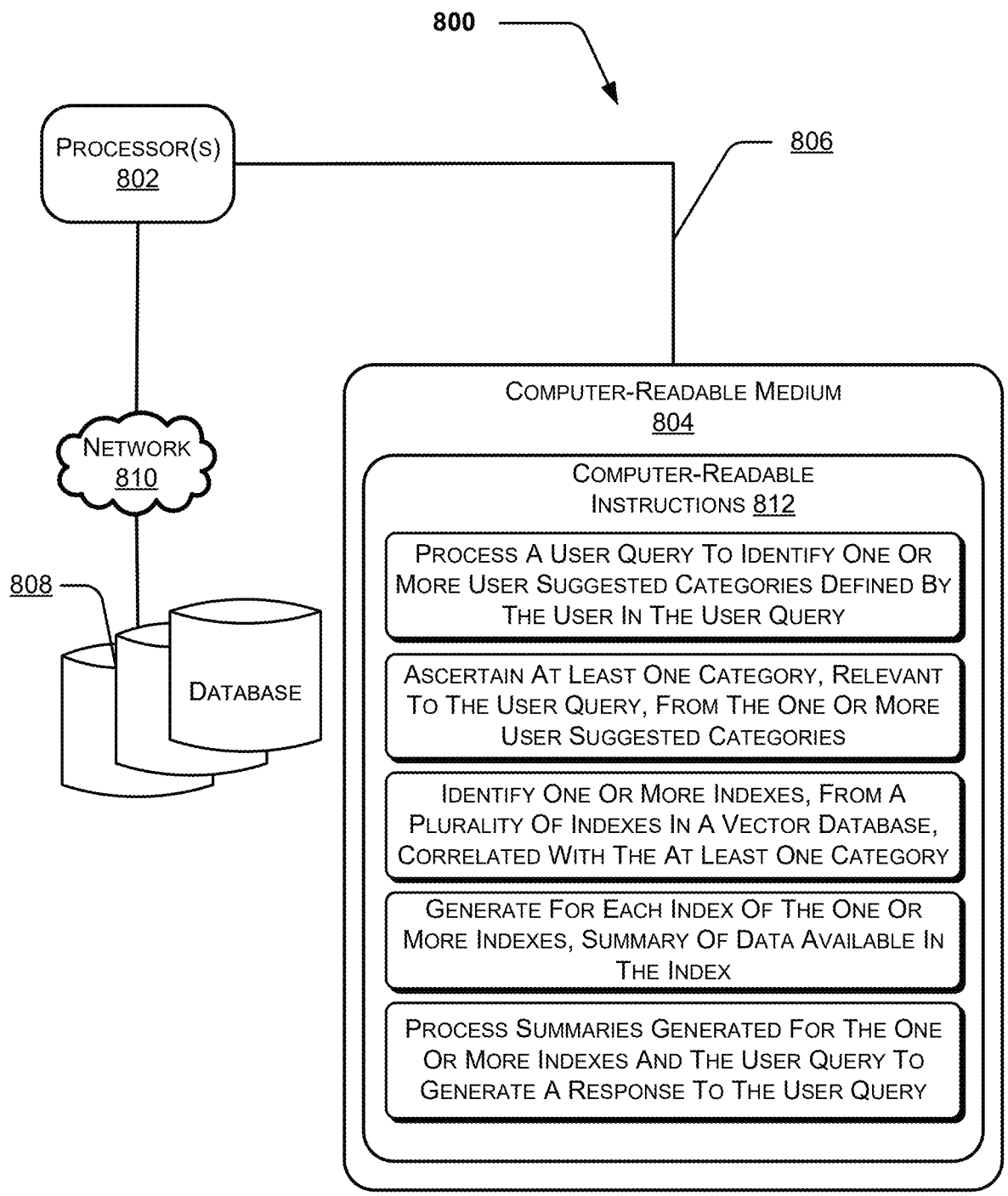
FIG. 8 illustrates a computing environment implementing a non-transitory computer-readable medium executing enhanced query resolution techniques, according to an example.

FIG. 8 illustrates a computing environment 800 implementing a non-transitory computer-readable medium for enhanced query resolution, according to an example. In an example, the computing environment 800 may include a processor(s) 802 communicatively coupled to a non-transitory computer-readable medium 804 through a communication link 806. In one example, the communication link 806 may be similar to the network 206, as described in conjunction with the preceding figures. In an example implementation, the computing environment 800 may be the communication environment 200. In an example, the processor(s) 802 may have one or more processing resources for fetching and executing computer-readable instructions from the non-transitory computer-readable medium 804. The processor(s) 802 and the non-transitory computer-readable medium 804 may be implemented, for example, in the system 100 (as has been described in conjunction with the preceding figures).

The non-transitory computer-readable medium 804 may be, for example, an internal memory device or an external memory device. In an example implementation, the communication link 806 may be a network communication link. The processor(s) 802 and the non-transitory computer-readable medium 804 may also be communicatively coupled to one or more database 808 over a network 810. The database 808 may be similar to the database 204. The network 810 may be similar to the network 206 described in conjunction with FIG. 2.

In an example implementation, the non-transitory computer-readable medium 804 may include a set of computer-readable instructions 812 which may be accessed by the processor(s) 802 through the communication link 806. Referring to FIG. 8, in an example, the non-transitory computer-readable medium 804 may include computer-readable instructions 812 that may cause the processor(s) 802 to receive a user query which may be communicated or asked by a user. The query may be communicated or asked by the user when the user wishes to obtain a response associated to information which the user may require for any particular organisation or organizations.

In one example implementation, the computer-readable instructions 812 may cause the processor(s) 802 to process the user query to identify one or more user suggested categories which the user may define in the user query. In an example, the user query may be raised by the user using a user device such as the user device 202. In one example, the user may define within the user query, one or more user suggested categories such as "Products", "Sites", "Class of service", "customer ID". In one example, the user may define the user suggested category by natural language communication. In another example, the user may define the user suggested category by utilizing a user interface of the user device 202 (as shown in FIG. 2) which may provide checkboxes such as "Products", "Sites", "Applications", etc. for the user to select. The user may tick the checkboxes to define the user suggested category. In one example, the computer-readable instructions 812 may cause the processor(s) 802 to convert the user query to a vector representation to be used to identify one or more indexes from a plurality of indexes in the database.

In an example, the computer-readable instructions 812 may cause the processor(s) 802 to ascertain at least one category, relevant to the user query, from the one or more user suggested categories.

In an example, the computer-readable instructions 812 may cause processor(s) 802 to identify one or more indexes from the plurality of indexes in the database 808. In one example, the database 808 may be similar to the database 204 and may be a vector database. The one or more indexes may be identified from the plurality of indexes of the database 808 based on the correlation of the index with the at least one user suggested category. In an example, the computer-readable instructions 812 may cause processor(s) 802 to search the one or more indexes identified to respond to the user query.

In an example, the computer-readable instructions 812 may cause the processor(s) 802 to generate, for each index of the one or more indexes, a summary of data available in the index. In an example, the computer-readable instructions 812 may cause the processor(s) 802 to generate the summary of data for each of the one or more indexes of a content length within a permissible content length. In an example, the permissible content length may be the maximum number of words which may be present in the summary generated for the index. In an example, the computer-readable instructions 812 may cause the processor(s) 802 to calculate, for each index of the one or more indexes, the permissible content length for the summary of data available in the index. In one example, the permissible content length may be calculated based on a number of indexes determined to be searched and a context size of a query resolution model, such as the query resolution model 230 to be used for processing the user query.

In an example, the computer-readable instructions 812 may thus cause the processor(s) 802 to generate, for each index of the one or more indexes, the summary of data available in the index such that a sum of content length of summaries of the one or more indexes does not exceed the context size of the query resolution model (as shown in FIG. 1 and FIG. 2). In an example, the computer-readable instructions 812 may cause the processor(s) 802 to compare the sum of content lengths of summaries of each of the one or more indexes with the context size of the query resolution model. For the sum not exceeding the context size of the query resolution model, the processor(s) 802 may determine the query resolution model to be capable of analysing the summaries of the one or more indexes.

In an example, the computer-readable instructions 812 may cause the processor(s) 802 to process the summaries generated for the one or more indexes and the user query, to generate a response to the user query.

In an example, the computer-readable instructions 812 may cause the processor(s) 802, to convert the user query to the vector representation to be used to identify the one or more indexes from the plurality of indexes in the database.

In an example, once the at least one category, which is relevant to the user query has been ascertained, the computer-readable instructions 812 may cause the processor(s) 802 to provide the at least one category to the user to allow the user to further refine the user query.

In an example, the computer-readable instructions 812 may cause the processor(s) 802 to process the user query to determine the context of the user query and analyse the determined context of the user query to identify one or more user suggested categories defined by the user in the user query. In an example, the computer-readable instructions 812 may cause the processor(s) 802 to ascertain at least one category from the user suggested one or more categories which is relevant to the user query.

In an example, the computer-readable instructions 812 may cause the processor(s) 802, to calculate for each index of the one or more indexes the permissible content length of the data available in the index based on the number of indexes determined to be searched for responding to the user query and the context size of the query resolution model to be used for answering the user query.

In an example, once the summaries have been generated for each index of the one or more indexes, the computer-readable instructions 812 may cause the processor(s) 802 to compare the sum of the content lengths of the summaries generated for each index of the one or more indexes with the context size of the query resolution model 230 (as shown in FIG. 2). In an example, the computer-readable instructions 812 may cause the processor(s) 802 to determine that the query resolution model is capable of analysing the summaries generated for the one or more indexes for the sum of content lengths of summaries of each of the one or more indexes not exceeding the context size of the query resolution model.

In an example, the computer-readable instructions 812 may cause the processor(s) 802 to obtain a user feedback from the user asking the query. The feedback provided by the user for the generated response may then be analysed to further train the query resolution model 230.

In an example implementation, the computer-readable instructions 812 may cause the processor(s) 802 to identify one or more indexes from the plurality of indexes which are to be searched for responding to the user query based on one or more keywords which satisfy a predetermined condition and where the one or more indexes are correlated to the one or more keywords. In an example implementation, the computer-readable instructions 812 may cause the processor(s) 802 to identify one or more indexes from the plurality of indexes based on one or more index identifiers defined by the user in the user query which may indicate specific IDs or keywords, where the specific IDs or keywords correlate to the one or more indexes identified.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A method comprising:
processing a user query to obtain contextual data defining a context of the user query;
identifying, using the contextual data, one or more indexes from a plurality of indexes in a vector database, wherein the one or more indexes are to be searched to respond to the user query;
calculating, for each index of the one or more indexes, a permissible content length for a summary of data available in the index, wherein the summary is to be generated for being provided to a query resolution model for responding to the user query, and wherein the permissible content length is calculated based on a number of indexes determined to be searched and a context size of the query resolution model to be used for processing the user query;
generating, for each index of the one or more indexes, summary of the data available in the index using a summary generation model, wherein a sum of content lengths of summaries of each of the one or more indexes does not exceed the context size of the query resolution model, wherein the context size of the query resolution model is defined by a maximum number of tokens that the query resolution model can simultaneously process; and
providing the user query, in a desired format, and summaries generated for the one or more indexes to the query resolution model for generating a response to the user query.

2. The method as claimed in claim 1, further comprising:
obtaining a user feedback for the response generated for the user query; and
analysing the user feedback to further train the query resolution model.

3. The method as claimed in claim 1, further comprising:
converting the user query to a vector representation for being used to identify the one or more indexes from the plurality of indexes in the vector database.

4. The method as claimed in claim 1, wherein identifying the one or more indexes comprises analysing the contextual data to ascertain index identifiers defined by a user within the user query, wherein the index identifiers indicate specific IDs or keywords corresponding to the one or more indexes to be searched in the vector database, for providing response to the user query.

5. The method as claimed in claim 1, wherein identifying the one or more indexes comprises:
analysing the contextual data to determine one or more keywords satisfying a predetermined condition; and
identifying the one or more indexes correlated to the one or more keywords, from the plurality of indexes in the vector database.

6. The method as claimed in claim 5, wherein analysing the contextual data comprises:
analysing the contextual data to determine a plurality of keywords appearing in the user query;
ascertaining, for each of the plurality of keywords, conformance to the predetermined condition, wherein the predetermined condition includes at least one of frequency of appearance and contextual similarity with other keywords appearing in the user query; and
identifying the one or more keywords satisfying the predetermined condition.

7. The method as claimed in claim 1, wherein identifying the one or more indexes comprises:
analysing the contextual data to identify one or more user suggested categories related to the user query, wherein the one or more user suggested categories are defined by a user in the user query;
ascertaining at least one category from the one or more user suggested categories to be relevant to the user query; and
identifying the one or more indexes from the plurality of indexes in the vector database, correlated with the at least one category.

8. The method as claimed in claim 1, further comprising analysing processing capability details corresponding to the query resolution model to determine the context size of the query resolution model.

9. The method as claimed in claim 1, further comprising:
comparing the sum of content lengths of summaries of each of the one or more indexes with the context size of the query resolution model; and
for the sum not exceeding the context size of the query resolution model, determining the query resolution model to be capable of analysing the summaries of the one or more indexes.

10. A system comprising:
a query processing module to process a user query to obtain contextual data associated with the user query;
an index identification module to:
analyse the contextual data to identify one or more keywords satisfying a predetermined condition; and
identify one or more indexes correlated to the one or more keywords, from a plurality of indexes in a vector database, wherein the one or more indexes are to be analysed to respond to the user query;
a summary generation module to:
for each index of the one or more indexes, generate a summary of data available in the index utilizing a summary generation model, wherein a content length of the summary is within a permissible content length, and wherein a sum of content lengths of summaries of the one or more indexes does not exceed a context size of a query resolution model, wherein the context size of the query resolution model is defined by a maximum number of tokens that the query resolution model can simultaneously process; and
a query resolution module to:
parse the user query and summaries generated for the one or more indexes utilizing the query resolution model for generating a response to the user query using the query resolution model.

11. The system as claimed in claim 10, wherein the index identification module is to:
analyse the contextual data to determine a plurality of keywords appearing in the user query;
ascertain, for each of the plurality of keywords, conformance to the predetermined condition, wherein the predetermined condition includes at least one of frequency of appearance and contextual similarity with other keywords appearing in the user query; and
identify the one or more keywords satisfying the predetermined condition.

12. The system as claimed in claim 10, wherein the summary generation module is to:
analyse processing capability details corresponding to the query resolution model to determine the context size of the query resolution model; and
calculate, for each index of the one or more indexes, the permissible content length for the summary of data available in the index, wherein the permissible content length is calculated based on a number of indexes determined to be searched and the context size of the query resolution model to be used for processing the user query.

13. The system as claimed in claim 12, wherein the summary generation module is to:
compare the sum of content lengths of summaries of each of the one or more indexes with the context size of the query resolution model; and
for the sum not exceeding the context size of the query resolution model, determine the query resolution model to be capable of analysing the summaries of the one or more indexes.

14. The system as claimed in claim 10, wherein the query resolution module is to:
obtain a user feedback for the response generated for the user query; and
analyse the user feedback to further train the query resolution model.

15. The system as claimed in claim 10, wherein the query processing module is to convert the user query to a vector representation before processing the query.

16. A non-transitory computer readable medium having instructions stored thereon, the instructions, when executed by a processor, cause the processor to:
process a user query to identify one or more user suggested categories related to the user query, wherein the one or more user suggested categories are defined by the user in the user query;
ascertain at least one category, from the one or more user suggested categories, relevant to the user query;
identify one or more indexes, from a plurality of indexes in a vector database, correlated with the at least one category, wherein the one or more indexes are to be searched to respond to the user query;
generate, for each index of the one or more indexes, a summary of data available in the index utilizing a summary generation model, wherein a content length of the summary is within a permissible content length, and wherein a sum of content lengths of summaries of the one or more indexes does not exceed a context size of the query resolution model, wherein the context size of the query resolution model is defined by a maximum number of tokens that the query resolution model can simultaneously process; and
process, summaries generated for the one or more indexes and the user query, using the query resolution model, to generate a response to the user query.

17. The non-transitory computer readable medium as claimed in claim 16, wherein the non-transitory computer readable medium is to:
calculate, for each index of the one or more indexes, the permissible content length for the summary of data available in the index, wherein the permissible content length is calculated based on a number of indexes determined to be searched and the context size of the query resolution model to be used for processing the user query.

18. The non-transitory computer readable medium as claimed in claim 17, wherein the non-transitory computer readable medium is to:
compare the sum of content lengths of summaries of each of the one or more indexes with the context size of the query resolution model; and
for the sum not exceeding the context size of the query resolution model, determine the query resolution model to be capable of analysing the summaries of the one or more indexes.

19. The non-transitory computer readable medium as claimed in claim 16, wherein the non-transitory computer readable medium is to:
obtain a user feedback for the response generated for the user query; and
analyse the user feedback to further train the query resolution model.

20. The non-transitory computer readable medium as claimed in claim 16, wherein the non-transitory computer readable medium is to convert the user query to a vector representation to be used to identify the one or more indexes from the plurality of indexes in the vector database.

* * * * *